US007012996B2

(12) United States Patent
Polcyn

(10) Patent No.: US 7,012,996 B2
(45) Date of Patent: Mar. 14, 2006

(54) SYSTEM AND METHOD FOR OPERATING A HIGHLY DISTRIBUTED INTERACTIVE VOICE RESPONSE SYSTEM

(75) Inventor: Michael J. Polcyn, Allen, TX (US)

(73) Assignee: Intervoice Limited Partnership, Reno, NV (US)

(*) Notice: Subject to any disclaimer, the term of this patent is extended or adjusted under 35 U.S.C. 154(b) by 177 days.

(21) Appl. No.: 10/442,697

(22) Filed: May 21, 2003

(65) Prior Publication Data

US 2003/0198321 A1    Oct. 23, 2003

Related U.S. Application Data

(63) Continuation of application No. 09/134,601, filed on Aug. 14, 1998, now Pat. No. 6,614,885.

(51) Int. Cl.
  H04M 1/64    (2006.01)
  H04M 3/00    (2006.01)
(52) U.S. Cl. .............................. 379/88.01; 379/88.02; 379/88.03; 379/88.17; 379/88.18; 379/211.02; 379/212.01; 379/221.01; 379/265.01; 379/265.02; 379/265.09; 379/266.04
(58) Field of Classification Search .......... 379/265.01, 379/265.02, 265.09, 88.01, 88.17, 88.18, 379/88.02, 88.03, 211.01, 266.04
  See application file for complete search history.

(56) References Cited

U.S. PATENT DOCUMENTS

| 4,757,267 | A |   | 7/1988  | Riskin              |
| 4,800,583 | A | * | 1/1989  | Theis ........................ 379/67.1 |
| 4,922,519 | A |   | 5/1990  | Daudelin            |
| 4,979,206 | A |   | 12/1990 | Padden et al.       |
| 5,136,633 | A |   | 8/1992  | Tejede et al.       |
| 5,181,237 | A |   | 1/1993  | Dowden et al.       |
| 5,185,781 | A |   | 2/1993  | Dowden et al.       |
| 5,299,259 | A | * | 3/1994  | Otto ....................... 379/266.04 |
| 5,325,421 | A |   | 6/1994  | Hou et al.          |
| 5,555,299 | A |   | 9/1996  | Maloney et al.      |
| 5,581,553 | A | * | 12/1996 | Cave et al. .................. 370/362 |
| 5,586,171 | A |   | 12/1996 | McAllister et al.   |
| 5,652,785 | A |   | 7/1997  | Richardson et al.   |
| 5,675,704 | A |   | 10/1997 | Juang et al.        |
| 5,719,921 | A |   | 2/1998  | Vysotsky et al.     |
| 5,802,149 | A |   | 9/1998  | Hanson              |
| 5,805,674 | A |   | 9/1998  | Anderson            |
| 5,812,972 | A |   | 9/1998  | Juang et al.        |
| 5,835,568 | A |   | 11/1998 | Bass et al.         |
| RE36,051  | E |   | 1/1999  | Adams et al.        |

(Continued)

OTHER PUBLICATIONS

U.S. Appl. No. 09/134,601, filed Aug. 14, 1998, Polcyn.

*Primary Examiner*—Allan Hoosain
(74) *Attorney, Agent, or Firm*—Fulbright&Jaworski LLP

(57) ABSTRACT

A system and method of directing calls is disclosed for a telephone network having remote locations. The remote locations receive incoming calls and attempt to route the calls using a basic call director. If the remote location cannot route the call, then data, such as a recorded spoken utterance, is provided to a central system. The central system then attempts to automatically determine how to route the call using the data from the remote location. If the central system is unable to automatically determine the routing information, then the data is provided to an operator who attempts to determine how to route the call. Finally, a caller can be connected directly to the operator, if the operator is not able to determine routing information from the provided data alone.

48 Claims, 2 Drawing Sheets

U.S. PATENT DOCUMENTS

| | | |
|---|---|---|
| 5,940,493 A | 8/1999 | Desai et al. |
| 5,950,167 A * | 9/1999 | Yaker .................... 704/275 |
| 5,956,683 A * | 9/1999 | Jacobs et al. ............ 704/270.1 |
| 5,956,711 A | 9/1999 | Sullivan et al. |
| 5,991,617 A | 11/1999 | Powell |
| 6,038,533 A | 3/2000 | Buchsbaum et al. |
| 6,049,594 A | 4/2000 | Furman et al. |
| 6,076,072 A | 6/2000 | Libman et al. |
| 6,104,801 A | 8/2000 | Miloslavsky et al. |
| 6,233,315 B1 | 5/2001 | Reformato et al. |
| 6,246,759 B1 * | 6/2001 | Greene et al. ......... 379/265.02 |
| 6,269,153 B1 | 7/2001 | Carpenter et al. |
| 6,282,268 B1 * | 8/2001 | Hughes et al. ........... 379/88.03 |
| 6,427,002 B1 * | 7/2002 | Campbell et al. ........ 379/88.01 |

* cited by examiner

SYSTEM AND METHOD FOR OPERATING A HIGHLY DISTRIBUTED INTERACTIVE VOICE RESPONSE SYSTEM

RELATED APPLICATIONS

The present application is a continuation of co-pending and commonly assigned U.S. patent application Ser. No. 09/134,601 entitled "System and Method for Operating a Highly Distributed Interactive Voice Response System," filed Aug. 14, 1998, now U.S. Pat No. 6,614,885, the disclosure of which is hereby incorporated herein by reference.

TECHNICAL FIELD OF THE INVENTION

This invention relates to a system and method for providing call director functionality for enterprises in which there are many highly distributed field offices or locations.

BACKGROUND OF THE INVENTION

A call director is an interactive voice response (IVR) system which allows a caller to self-direct their call to a particular extension or department without the intervention of a live operator. The call director and IVR are typically attached to a private branch exchange (PBX). A call is answered at the remote location by the PBX and it is then routed to the IVR. The IVR prompts the caller to select from a menu of choices to direct the call. Typically, if the caller knows the party's direct extension, the caller can enter it to be immediately connected to the party. Otherwise, the caller must follow the menu choices or select a directory of employees in order to be properly connected.

Call director systems are typically used in a small business or single location situation. However, in certain cases, especially when dealing with retail operations or large companies having many employees or a large number of departments or products, the reasonableness of providing a simple menu-based or direct extension dialing scenario is diminished. In these situations, the large number of possible parties or extensions that may be called will cause the call director application to become too complex.

One solution to this problem would be to provide a large vocabulary voice recognition-based call director. This type of call director allows a caller to speak the department or the product name in which they are interested and, if the call director recognizes the caller's utterance, the call director connects the caller to the appropriate party based upon the spoken information. The problem with this type of system is that voice recognition technology and the software required to run a large vocabulary voice recognition system is very expensive. As a result, if a voice recognition system is deployed at every one of the regional centers or remote offices, the system could become prohibitively expensive to operate and maintain.

In addition to the high cost, there are maintenance problems associated with these systems. In a large company with many remote locations, such as individual retail outlets, there would not be technical personnel at each location that are trained to operate and maintain complex telecommunications systems, such as a large vocabulary voice recognition call director, therefore, it would be difficult to keep such a system operating at each location.

Another solution is to provide a live operator that can interact with callers and direct calls. However, this solution is also prohibitive because the cost of having a live operator at every location is significant.

An ideal situation would allow calls to be handed off from individual remote locations to a centralized call center that would direct each call. This arrangement has problems because, although there is a centralized call center directing the calls, the incoming calls still go into the remote locations. The remote locations would try to direct the call automatically and, if they could not direct the call, then the caller would be transferred through the telephone network to a centralized call center. The central operator would have to interact with the caller and then direct the PBX as to where to connect the call. This solution presents an increased cost for the live operators in the central location and there would be increased telephone line costs associated with bringing those calls to the regional or central call center.

SUMMARY OF THE INVENTION

These and other problems are solved by a system and method in which all incoming calling connections are terminated at a call director at a remote location and that call director attempts to direct the terminated calls. When a remote call director is unable to identify a caller's requested destination, then the system utilizes a large vocabulary voice recognition system located at a central location to route the calls. The call director module is placed at remote locations, such as at any retail store or remote regional office, and the centralized large vocabulary voice recognition based system replaces the functionality of a live operator at either the remote or the central location. The connection between the various remote call directors and the central location could be either through standard telephone network lines or a data network, but the caller's connection to the system remains at the remote call director.

It is one feature of the present invention to provide an interactive menu to callers via the remote call director and to allow callers to dial a department or an extension by themselves under the control of the remote call director. If the callers are unable to complete the call by themselves, then they could ask for additional assistance. The system provides assistance by interacting, under control of the remote call director, with callers by using voice prompts which ask the caller to record the product or department name that they are interested in. The response from the caller, such as a product or department name, would be recorded and then passed asynchronously, either through a telephone or data network to the central large vocabulary voice recognition system. The central voice recognition system operates to match the caller's recorded request with a known department, individual or product. Once the caller's request is identified, then the result is directed back to the remote call director to facilitate completion of the call.

Another feature of the invention provides back up operators that could listen to the utterance if the central recognition system is unable to identify and match the caller's utterance. These operators could listen to the recorded request without speaking or interacting directly with the caller, thereby eliminating any overhead of conversation and dialogue with the caller. In effect, this arrangement would provide a live operator backup for the large vocabulary voice recognition system, but it would appear to the caller that the system handled the call without the assistance of a live operator.

An advantage of the present invention is that it eliminates problems associated with directing calls among a remote location call director, a central voice recognition system, a live operator and an ultimate destination. In the present invention, the incoming call is terminated at the remote location's IVR system or call director and no further switching of the caller's telephone connection is required. Accordingly, typical telephone system problems, such as impedance matching, line quality and signal loss, are substantially eliminated because the call is not transferred from the remote location to the central voice recognition system to the live operator. Since the call is terminated at the remote location, there will always be consistent, high quality voice interaction at that point. All of the interaction between the remote call director and the central voice recognition system and live operators will take place on a separate data connection.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
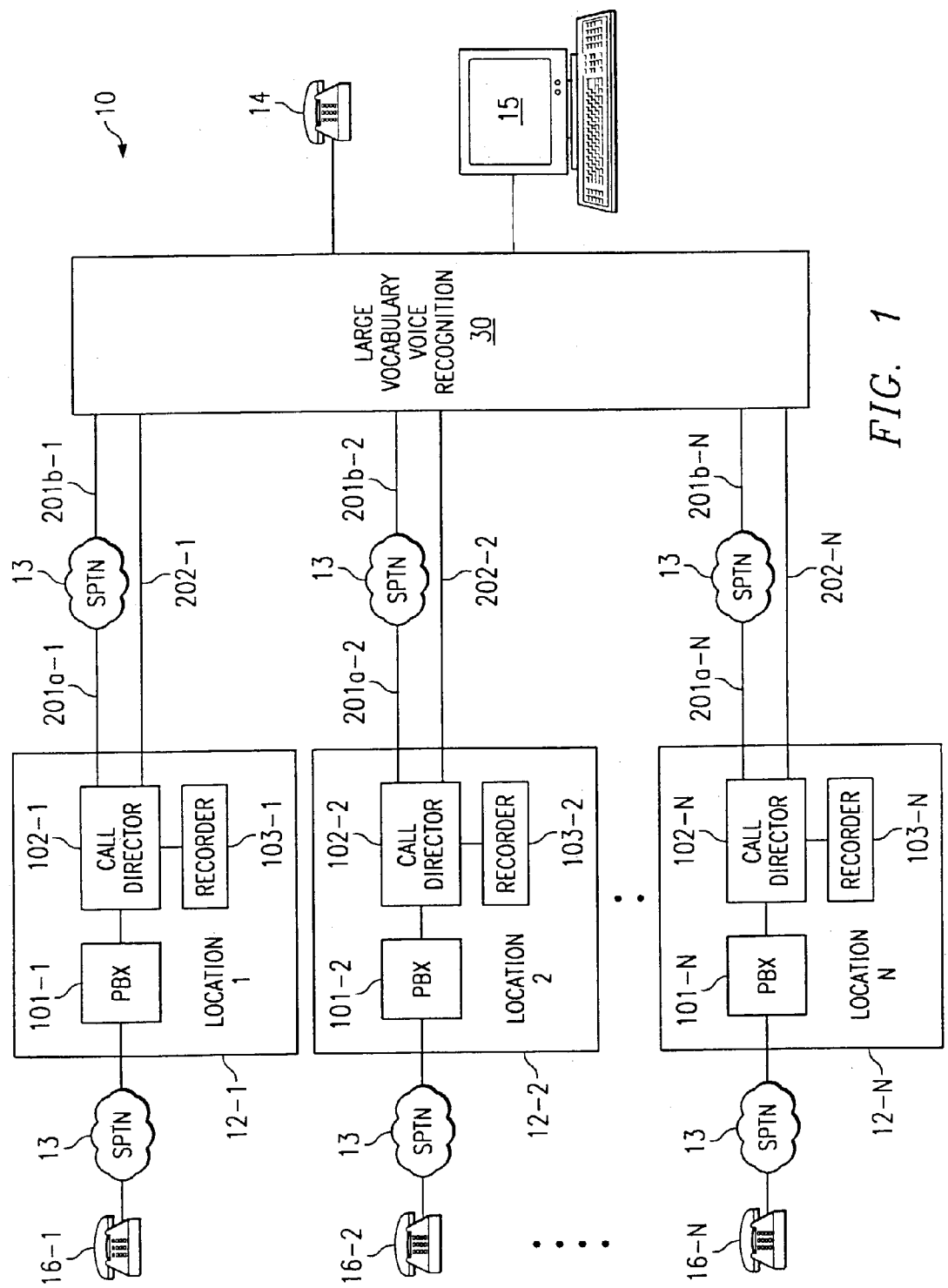
FIG. 1 is a block diagram of a call director system employing the present invention.

FIG. 1 shows an overview of system 10 having large vocabulary voice recognition system 30 connected to one or more remote locations 12-1 to 12-N. Each remote location, 12-1 to 12-N, is preferably of substantially similar construction and operation, but they could comprise different designs. Accordingly, the preferred embodiment will be described with respect to remote location 12-N, with the understanding that the function of each remote location is of a similar nature. Remote location 12-N is typically comprised of PBX 101-N, call director 102-N and recorder 103-N.

In a typical system employing the present invention, a caller who desires information about a particular product or service uses telephone 16-N to call their local retailer at remote location 12-N. Telephone 16-N is connected to remote location 12-N through switched public telephone network (SPTN) 13. The inbound call typically terminates in PBX 101-N at remote location 12-N. PBX 101-N routes the call to call director 102-N which attempts to connect the caller with the proper extension or party. Initially, call director 102-N operates like prior art call directors in that it answers the call, conducts a dialogue with the caller, and presents the caller with a set of choices for self-directing the call. The call can be completed to a desired person or database or to various information providing applications, depending only on the calling party's desired results. The caller may be presented with options such as, entering, an extension or routing number to complete the call. Call director 102-N may also be capable of completing the call by recognizing a small set of voice recognition utterances under control of systems (not shown) located within call director 102-N or within location 12-N. These utterances would be recorded in recorder 103-N.

If the call could not be routed automatically, then system 10 would move into a second level of functionality in which call director 102-N (assuming that it has not already done so) conducts a dialogue with the caller and asks the caller to speak the name of a product or a service that the caller would like more information about. The caller could also speak the name of a department or individual to whom they would like to be connected. At that point call director 102-N would record the caller's response or utterance (assuming such utterances had not already been recorded) in recorder 103-N. The recorded information would then be packetized or digitized so that it could be transferred over a data connection.

The digitized utterance is then transmitted to central voice recognition system 30 either via a telephone connection, such as over telephone lines 201a,b-N through SPTN 13, or via data connection 202-N through a medium such as the internet or some other data connection. Connection 202-N can be any data interface that allows the recorded voice data to pass between remote location 12-N and voice recognition system 30. Once the caller's recorded request is received at the central location, then voice recognition system 30 applies large vocabulary voice recognition algorithms to the packet of recorded voice information to determine what the caller requested. In the ideal situation, system 30 would recognize a specific product, department or individual from the caller's utterance.

If voice recognition system 30 is able to understand the caller's request with a high level of confidence, then it would correlate that request to some other information, such as a telephone extension or a pre-recorded message. That information is then provided by system 30 to remote call director 102-N. At that point, call director 102-N would complete the call either by transferring the call or by playing the pre-recorded message.

In the event that large vocabulary voice recognition system 30 fails to recognize the caller's utterance, or if system 30 is overloaded, then the recorded utterance could be provided to a live operator over telephone connection 14. Upon connecting to the operator, voice recognition system 30 would play the caller's recorded utterance. If the operator recognized and understood the caller's utterance, then the operator could enter the information into system 30 via terminal 15. Voice recognition system 30 would then be able to return a response to call director 102-N with instructions on how the call should be handled.

If the live operator could not understand the utterance, for example if the words were garbled, unintelligible or in a foreign language, then the operator would have the option of passing unique messages to call director 102-N via voice recognition system 30. These messages could instruct call director 102-N to perform additional functions, such as re-prompting the caller to speak or initiating some additional or predetermined dialogue with the caller. In some situations, the operator may direct call director 102-N to route the call to the operator's telephone 14. In this situation, control of the call would also be transferred to the live operator.

Figure 2:
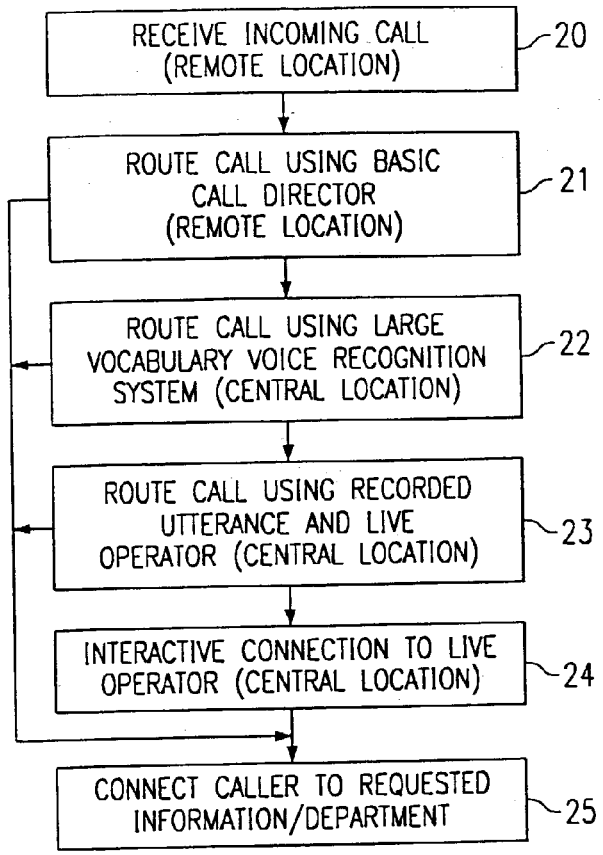
FIG. 2 is a flow chart that illustrates the steps that are followed in the present invention to identify caller requests.

FIG. 2 is a flowchart representing the steps followed by system 10 to route incoming calls. System 10 attempts to connect incoming callers with the requested information, department or individual at the earliest possible step. In step 20, an incoming call is received at the remote location. Remote call director 102-N attempts to direct the call in step 21. As discussed above, remote call director 102-N may use an interactive voice response system with a limited vocabulary or it may use a menu-based system. If remote call director 102-N recognizes the caller's request in step 21, then the caller is connected directly to the requested information or department in step 25. If remote call director 102-N cannot recognize the caller's request in step 21, then the caller's recorded utterance is provided to voice recognition system 30 for routing in step 22.

If centrally located voice recognition system 30 can match the recorded utterance to its large vocabulary in step 22, then the caller is connected in step 25 to the called party or service. However, if the utterance is not recognized by system 30, then in step 23 the recorded utterance is provided to a live operator for routing. Initially in step 23, the recorded utterance is played for the operator over connection 14 and, if the request is recognized, then the operator provides information to voice recognition system 30 so that the call can be connected in step 25. On the other hand, if the live operator does not recognize the recorded utterance, then the operator can cause call director 102-N to request the caller to speak again, or the operator can initiate a direct, interactive connection with the caller as shown in step 24, or the operator can take any number of other actions.

In operation, the present invention provides three levels of automation. The first level (step 21) comprises the interactive menus that are provided to callers by remote call director 102-N at each remote location 12-N. If the first level menus fail, then the second level of automation is provided by large vocabulary voice recognition system 30 (step 22). System 30 operates in an automated mode in which it replies to queries in the form of recorded utterances from remote call director 102-N. Finally, the third level of automation occurs when a caller's request is provided as an asynchronous pre-recorded utterance to a live operator (step 23). Once the operator identifies the utterance, he can then provide information to system 30 through terminal 15. This information can be used by large vocabulary voice recognition system 30 to more accurately identify the caller's request and to instruct call director 102-N at the remote location how to route the call.

A fourth possible treatment of an incoming call allows the live operator to either control the actions of remote call director 102-N or have the call director route the live telephone call to that operator's position. In this case, the operator will directly interact with the caller to determine how the call should be directed (step 24). It will be understood that in the automated mode, before a live interaction is initiated, the operator does not have to communicate directly with the caller. Instead, the recorded utterance is provided to the operator over connection 14 without any indication to the caller that an operator is assisting in placing the call.

Figure 3:
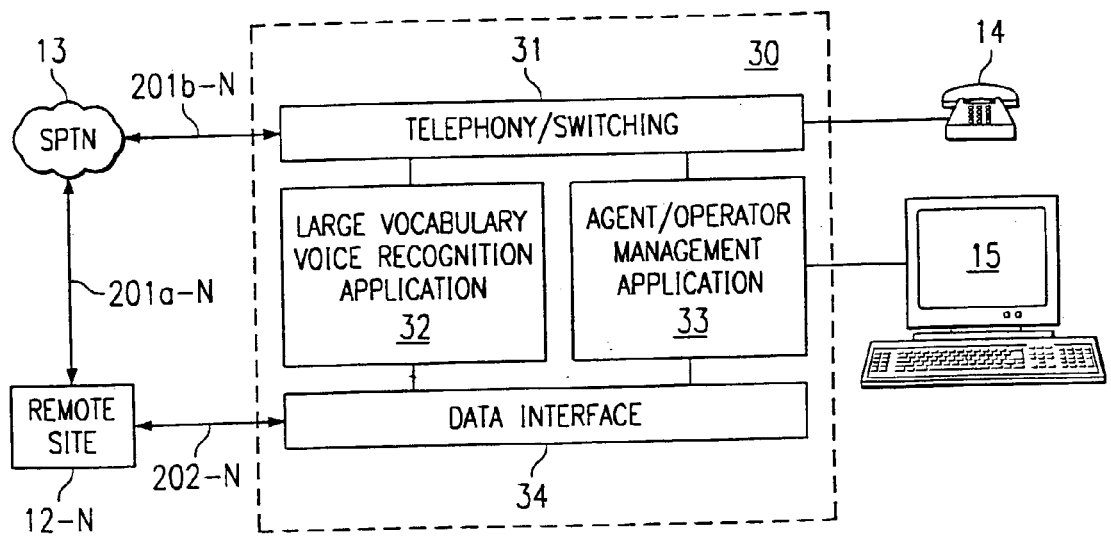
FIG. 3 is a detailed block diagram of the central location voice recognition system of the present invention.

Turning now to FIG. 3, a detailed diagram of large vocabulary voice recognition system 30 is shown. In addition to voice recognition application 32, system 30 is comprised of agent management section 33, telephony switching section 31 and data interface section 34. Lines 201*a*-N and 201*b*-N correspond to the similarly labeled lines in FIG. 1 and represent telephone lines that connect system 30 to remote location N through SPTN 13. Lines 201*a,b*-N are optional and they are not required in all implementations or at each remote location. However, in the preferred embodiment, system 10 would have both telephone lines 201*a,b*-N and data links 202-N. Telephone lines 201*a,b*-N may be dedicated telephone lines or they may represent a dial-up connection that is made only when remote call director 102-N is unable to identify the caller's request.

Data line 202-N can be any data link, such as internet, intranet, private data network or dial-up telephone lines via modem. Line 202-N is a data connection and it does not have to carry real time duplex conversation. Like telephone lines 201*a,b*-N, data links 202-N of FIG. 3 correspond to the similarly labeled lines shown in FIG. 1.

Telephony/switching circuitry 31 provides two functions. The first function is to drive operator's telephone set 14. Circuit 31 provides the functionality to play the received asynchronous message from remote system 12-N. The second function of telephony/switching circuit 31 is to provide the connection between telephone lines 201*a*, b-N and agent telephone set 14. This gives system 30 the basic functionality of a telephony switch with the added functionality of being able to replay prerecorded voice messages to the agent. Circuit 31 could also record responses from an agent or operator and direct those asynchronously via agent operator management application 33 through data interface 34 and back to the original caller.

Agent operator management application 33 is an application that controls and provides an interface to the agent's terminal 15. This allows the operators to interact with system 30 by entering the department name or the extension that the caller is to be connected to. This information is returned via data interface 202-N to remote call director 102-N. The agent can also have the option of sending commands via data interface 34 and data connection 202-N to remote call director 102-N to control various remote call director 102-N functions, such as prompting the user for additional information or invoking other applications in the remote location IVR.

It should be noted that the operator can input data through agent terminal 15 or agent telephone 14. This data would be then be analyzed by voice recognition system 30 as opposed to the caller's originally recorded utterance. The agent could also listen to the caller's utterance and then speak the proper words or use proper pronunciation over telephone 14. This would allow the operator to enunciate the words very clearly so that the voice recognition system would have a clearer, more accurate utterance to use in its search and to match to its vocabulary.

Large vocabulary voice recognition application 32 uses state of the art technology that would provide some very large number of utterances, on the order of tens of thousands of utterances, that would include items such as department names, individual names, product names and generalized product areas. Each one of those utterances could be linked back to a specific directory number for a particular calling center.

Typically system 10 operates as follows, call director 102-N at remote location 12-N answers an incoming call and interacts with the caller via an IVR system. If call director 102-N is unable to direct the call, then it records the caller's desired destination and passes the recorded information to voice recognition system 30 via asynchronous interface 202-N. Voice recognition application 32 attempts to match the data sent from location 12-N with its large vocabulary. If it is able to recognize the caller's requested department, individual or product with a high confidence level, then system 30 returns a message, via data interface 34 across data lines 202-N, to remote call director 102-N for completion of the call.

If voice recognition application 32 does not have a high confidence level in its output or if it does not recognize the caller's utterance, then it can pass control of the call to a live agent. Initially, the operator interacts with system 10 by playing and listening to the message recorded by the caller. The agent can replay the message and exercise control over message playback, such as slowing it down or speeding it up. If the agent recognizes the message, the agent can enter certain codes at terminal 15 that are then transmitted via the data interface 24 through lines 202-N to call director 102-N to complete the call.

Another option is that the agent could take advantage of large vocabulary voice recognition system 30 and simply re-enunciate the caller's desired product or department. This would bypass any keystrokes or other data entries at the agent's terminal 15. Instead, the call can be dealt with quickly via agent's telephone 14.

In addition, the agent could recognize that the caller's input is a specialized vocabulary. For example, the recorded utterance could be a specialized or technical term or acronym or the caller may be using a foreign language. The agent could direct application 32 to switch to a different vocabulary database to attempt to identify the request. For example, application 32 may have a number of databases, such as databases for selected foreign languages or a database of very specialized technical vocabulary.

The agent also could change the level of certainty that was required to provide a match within a selected database. The match certainty level could be adjusted downward so that large vocabulary voice application 32 returns more potential matches. The level could also be adjusted upward to reduce false matches.

In an alternative embodiment, system 10 could operate so that caller requests from certain locations 12-N are always matched against particular additional databases, such as a certain foreign language or technical database. For example, calls from locations near the Mexican boarder could be matched against both English and Spanish databases, while calls from locations near Canada could be matched against both English and French databases. Databases could also be created to reflect local and regional dialects, so that calls from a remote locations in certain regions are matched against both a standard English database and a database of words pronounced with using the regional dialect. Also, temporary databases could be used with system 10 to address situations in which there are temporary changes in the products or services available.

Although the present invention and its advantages have been described in detail, it should be understood that various changes, substitutions and alterations can be made herein without departing from the spirit and scope of the invention as defined by the appended claims.

What is claim is:

1. A method of directing calls in a telephone network comprising the steps of:
   receiving a call at a remote location, wherein said remote location is remote with respect to a central location in data communication therewith;
   if routing information for said call sufficient for completion of desired directing of said call can be determined at said remote location in response to an interaction between a caller and said remote location, then directing said call to a desired extension in accordance with said interaction; and
   if said routing information for said call sufficient for completion of desired directing of said call cannot be determined at said remote location in response to said interaction, then providing data associated with said call, including data obtained in response to said interaction, to said central location for interaction between the remote location and the central location, said central location being in data communication with a plurality of remote locations including said remote location, and determining automatically at said central location, from said interaction, routing information sufficient for completion of desired directing of said call which remains at said remote location.

2. The method of claim 1 wherein said provided data includes a recorded utterance of a caller.

3. The method of claim 2 wherein said recorded utterance is used by a voice recognition system at said central location to determine said routing information.

4. The method of claim 3 wherein said voice recognition system comprises a large vocabulary voice recognition system.

5. The method of claim 1 further comprising the step of:
   comparing said provided data to a database at said central location.

6. The method of claim 5 wherein said provided data comprises a recorded utterance of a caller; and
   wherein said database comprises a database of known utterances.

7. The method of claim 6 wherein said database comprises a large vocabulary database.

8. The method of claim 6 wherein said database comprises a foreign language database.

9. The method of claim 6 wherein said database comprises technical vocabulary database.

10. The method of claim 1 wherein said routing information is determined by a call director system at said remote location.

11. The method of claim 1 wherein said routing information is determined using an interactive menu.

12. The method of claim 11 wherein said interactive menu accepts voice inputs.

13. The method of claim 11 wherein said interactive menu accepts DTMF inputs.

14. The method of claim 1 further comprising the step of:
   if said routing information cannot be determined automatically at said central location, then providing at least a portion of said provided data to an operator.

15. The method of claim 14 wherein said provided data comprises an utterance of a caller.

16. The method of claim 14 wherein said operator can prompt, via said call director system, a caller to provide additional data.

17. The method of claim 16 wherein said additional data comprises additional utterances by said caller.

18. The method of claim 14 further comprising the step of:
   connecting said call to an extension selected by said operator.

19. The method of claim 18 wherein said operator directs a remote call director to connect said call.

20. The method of claim 14 further comprising the step of:
   if said routing information cannot be determined by said operator using said provided data, then establishing an interactive connection between said operator and a caller.

21. The method of claim 20 wherein said interactive connection allows said operator to speak to said caller.

22. The method of claim 20 further comprising the step of: connecting said call to an extension selected by said operator.

23. The method of claim 20 further comprising the step of: routing said call as directed by said operator.

24. A remote call director system for a telephone network in which a plurality of said remote call director systems are linked to a central system, wherein callers are first connected to said remote system and wherein calls are directed by said remote call director system using information provided by said callers, said remote call director system comprising:
means for interacting with said callers to thereby gather routing information, wherein said interacting means comprises a small vocabulary voice recognition system;
means for independently determining call directing information using said routing information;
means for directing said calls using said directing information; and
means for providing at least a portion of said gathered routing information to said central system, disposed at a location separate from said remote call director system, for interaction between the central system and the remote call direction system when said determining means is unable to determine call directing information, wherein said providing means does not provide said at least a portion of said gathered routing information to said central system when said determining means is able to determine call directing information.

25. The system of claim 24 wherein said interacting means comprises an interactive menu.

26. The system of claim 24 wherein said provided routing information comprises an utterance of said caller.

27. The system of claim 24 further comprising:
means for accepting call directing information from said central system, wherein said call directing information accepted from said central system is determined using said provided data.

28. The system of claim 27 further comprising:
means for directing said calls in accordance with said directing information accepted from said central system.

29. The system of claim 27 further comprising: means for providing an interactive connection between said caller and an operator.

30. The system of claim 29 wherein said central system directs when to establish said interactive connection.

31. The system of claim 27 further comprising:
means for prompting said caller to provide additional information.

32. The system of claim 31 wherein said prompting means is used to prompt said caller to repeat an utterance.

33. A central system for a telephone network in which a plurality of remote systems are linked to said central system, wherein callers are first connected to one of said remote systems and wherein calls remain at said remote system and are directed by said remote system using information provided by said central system, said central system comprising:
means for receiving routing data from each said remote system for an interaction between said central system and said remote system, wherein said data is associated with a particular call, wherein at least a portion of said routing data has been utilized by an associated said remote system in an interaction between said remote system and said particular call to determine directing information before being accepted by said central system;
means for determining directing information for said particular call using at least a portion of said accepted routing data, wherein said determining means provides more complex directing information determining than utilized by said associated remote system with respect to said routing data; and
means for providing said directing information to said remote system associated with said particular call.

34. The system of claim 33 wherein said accepted routing data comprises an utterance of a caller.

35. The system of claim 33 wherein said determining means comprises a voice recognition system.

36. The system of claim 35 wherein said voice recognition system compares a caller's utterance to one or more databases of known utterances.

37. The system of claim 36 wherein one of said databases comprises a large vocabulary database.

38. The system of claim 37 wherein one of said databases comprises a technical vocabulary database.

39. The system of claim 37 wherein one of said databases comprises a foreign language vocabulary database.

40. The system of claim 33 further comprising:
means for providing at least a portion of said accepted routing data to an operator.

41. The system of claim 40 wherein said accepted routing data comprises an utterance of said caller.

42. The system of claim 40 further comprising:
means for providing routing information to said remote system.

43. The system of claim 40 further comprising:
means for establishing an interactive connection between said operator and said callers.

44. The system of claim 40 further comprising:
means for prompting said caller to provide additional data.

45. The system of claim 44 wherein said prompting means is controlled by said operator.

46. The system of claim 44 wherein said prompting means is controlled by said determining means.

47. The system of claim 44 wherein said prompting means prompts said caller to repeat an utterance.

48. The system of claim 44 wherein said additional data comprises an additional utterance.

* * * * *